United States Patent Office 3,297,556
Patented Jan. 10, 1967

3,297,556
MANUFACTURE OF 2-CHLOROPYRIDINE USING PHOTOLYTIC LIGHT
Max M. Boudakian, Hamden, and Joel A. Zaslowsky, Woodbridge, Conn., assignors to Olin Mathieson Chemical Corporation, a corporation of Virginia
No Drawing. Filed Nov. 28, 1962, Ser. No. 240,711
8 Claims. (Cl. 204—158)

This invention relates to the preparation of 2-halopyridines, such as 2-chloropyridine.

2-halopyridines are useful as intermediates in the preparation of fungicides, bacteriostatics, and other biologically-active materials.

Numerous techniques have been developed for the production of 2-halopyridines such as 2-chloropyridine. For example, chlorine and pyridine have been reacted in the vapor phase with or without diluents at elevated temperatures (above 300° C.) to yield 2-chloropyridine. This technique has been found to be economically unsatisfactory because of poor yields. This high temperature vapor phase process is characterized by tarring, flaming and corrosion problems.

It is a primary object of this invention to provide an improved process for preparing 2-halopyridines, such as 2-chloropyridine, which overcomes the disadvantages of prior art processes.

Another object of this invention is to provide an improved process for preparing 2-chloropyridine wherein the formation of tarry by-products is minimized.

These and other objects of the invention will be apparent from the following detailed description of the invention.

The novel process of this invention may be employed to prepare 2-halopyridines, such as 2-chloropyridine and 2-bromopyridine. For purposes of simplicity the invention will be described with respect to the reaction of chlorine with pyridine to form 2-chloropyridine with the understanding that 2-bromopyridine can likewise be prepared from bromine, and that mixtures of 2-bromopyridine and 2-chloropyridine can be prepared from bromine chloride.

It has now been discovered that 2-chloropyridine can be obtained in good yield by reacting chlorine with pyridine under photolytic conditions.

The molar proportion of pyridine to chlorine employed in the reaction of this invention is generally between about 1:1 and about 10:1, and preferably between about 1:1 and about 6:1. When the molar ratio is less than about 1:1, the yield of 2-chloropyridine is reduced substantially. However the ratio may be increased substantially above 10:1 without significantly affecting the yield of 2-chloropyridine, but there is a significant expense in handling the excess amount of material.

The chlorination reaction is conducted in the presence of light to convert pyridine to 2-chloropyridine. Generally radiant energy sources predominating in the range between about 2,000 and about 7,500 angstrom units, and preferably between 2,000 and about 5,000 angstrom units, effect the desired degree of chlorination. Typical examples of suitable light sources are ultraviolet light, mercury vapor light, black fluorescent light and the like.

The reaction may be carried out in either the vapor phase or the liquid phase. Satisfactory results can be obtained when the temperature is maintained between about 78 and about 125° C., but higher or lower temperatures may be employed if desired. When the reaction is carried out in the liquid phase, reflux conditions have been found to be satisfactory; (a temperature of between about 78 and 80° C.), but higher or lower temperatures may be employed if desired.

When the reaction is carried out in the liquid phase, a large excess of pyridine, or if desired, a suitable solvent may be employed. Typical examples of suitable solvents include, but are not restricted to, carbon tetrachloride, a mixture of pyridine and water, and fluorinated aliphatic compounds such as $CFCl_2CFCl_2$ (boiling point of 92.8° C.). The proportion of solvent is not critical and is generally added in a molar ratio of solvent to pyridine of between about 0.5:1 and about 11:1.

The reaction time will vary depending upon whether the reaction is carried out in the vapor phase or liquid phase, upon the proportion of pyridine to chlorine, and upon the temperature and pressure of reaction.

The following examples are presented without any intention of being limited thereby. All parts and percentages are by weight unless otherwise specified.

The apparatus employed in carrying out the following examples included a one-liter, three-necked flask provided with an electric stirrer, a thermometer and a cold water condenser. A chlorine gas inlet distributor was positioned to release the chlorine about 1 to 1.5 inches below the surface of the liquid reactant. An electrically heated mantle surrounded the bottom of the flask, and the light source was directed to illuminate the vapor phase region above the reactants, generally, about 4 inches from the flask.

The light sources used in the following examples had the following characteristics:

TABLE I.—SPECTRAL AND POWER CHARACTERISTICS OF LIGHT SOURCES

| Light | Description | Power Rating (watts) | Spectral Characteristics | | |
|---|---|---|---|---|---|
| | | | Region A. | Radiated Energy | |
| | | | | (Watts) | (Percent) |
| A | Mercury vapor (high pressure, quartz) | 100 | 2,200–2,800 (Far u.v.) | 1.70 | 12.41 |
| | | | 2,800–3,200 (Middle u.v.) | 2.55 | 18.61 |
| | | | 3,200–4,000 (Near u.v.) | 2.00 | 14.60 |
| | | | 4,000–6,000 (Visible) | 4.35 | 31.75 |
| | | | 10,000–14,000 (Infrared) | 3.10 | 22.62 |
| | | | Total | 13.70 | 99.99 |
| B | Black Fluorescent (16.5″ x 1.0″) | 15 | 2,900–3,000 ⎫ | 0.004 ⎫ | |
| | | | 3,000–3,100 ⎬ Middle u.v. | 0.011 ⎬ | 2.68 |
| | | | 3,100–3,200 ⎭ | 0.079 ⎭ | |
| | | | 3,200–3,400 ⎫ | 0.610 ⎫ | |
| | | | 3,400–3,600 ⎪ | 1.310 ⎪ | |
| | | | 3,600–3,800 ⎬ Near u.v. | 0.910 ⎬ | 86.80 |
| | | | 3,800–4,000 ⎭ | 0.218 ⎭ | |
| | | | 4,000–5,000 ⎫ Visible | 0.248 ⎫ | 10.49 |
| | | | 5,000–6,000 ⎭ | 0.120 ⎭ | |
| | | | Total | 3.510 | 99.97 |

TABLE I.—SPECTRAL AND POWER CHARACTERISTICS OF LIGHT SOURCES—Continued

| Light | Description | Power Rating (watts) | Spectral Characteristics | | |
|---|---|---|---|---|---|
| | | | Region A. | Radiated Energy | |
| | | | | (Watts) | (Percent) |
| C | White Spot, Reflector, 120 volts, Filament color temp., 2,600° K. | 75 | 3,200-3,500 } Near u.v. <br> 3,500-4,000 | 0.002 <br> 0.006 | 0.70 |
| | | | 4,000-4,500 | 0.019 | |
| | | | 4,500-5,000 | 0.041 | |
| | | | 5,000-5,500 | 0.073 | 39.90 |
| | | | 5,500-6,000 | 0.035 | |
| | | | 6,000-7,500 | 0.181 | |
| | | | 7,500-9,000 } Infrared <br> 9,000-10,000 | 0.308 <br> 0.365 | 59.40 |
| | | | Total | 1.120 | 100.00 |

Examples 1–3

To illustrate the effect of various light sources upon the yield of 2-chloropyridine, the following tests were carried out in the above described apparatus. In Example 1, Light C was employed and there was charged 0.2 mole of pyridine dissolved in 2.07 moles of carbon tetrachloride. While heating this solution to reflux (78° C.), gaseous chlorine was bubbled through the distributor for 87 minutes. A total of 11.5 grams of chlorine was fed to the system and 5.0 grams was discharged through the condenser, indicating a consumption of 56.5 percent chlorine. This was equivalent to a terminal molar ratio of 1.2 moles of pyridine to 1 mole of chlorine. The resulting slurry was filtered to yield 4.7 grams of solids. Upon analysis, these solids were found to consist of pyridine hydrochloride. Analysis of the liquid filtrate by vapor phase chromatography indicated a conversion of 51.3 percent of the pyridine and a yield of 31.5 percent 2-chloropyridine.

In Example 2, the procedure of Example 1 was repeated with the exception that Light B was employed, 0.4 mole of pyridine and 4.13 moles of carbon tetrachloride were employed, and sufficient chlorine was passed through the system for 89 minutes to provide a terminal molar ratio of 2 moles of pyridine to 1 mole of chlorine. Analysis of the liquid filtrate showed 48.7 percent conversion of pyridine and a yield of 55.5 percent 2-chloropyridine.

In Example 3, the procedure of Example 1 was employed with the exception that Light A was used and sufficient chlorine was passed through the system for 30 minutes to yield a terminal molar ratio of 2 moles of pyridine to 1 mole of chlorine. Analysis of the product indicated a 43.9 percent conversion of pyridine and a yield of 69.4 percent 2-chloropyridine.

For purposes of comparison when the procedure of Example 1 was repeated without the use of any artificial light, analysis of the filtrate showed a conversion of only 13.2 percent pyridine with no detectable yield of 2-chloropyridine.

Examples 4–6

To illustrate the effect of light intensity on the yield of 2-chloropyridine the following tests were carried out. In the three examples, Light B was used, the bulb being taped to cover a portion of its area to give a light intensity of about 10.5, 5.6, and 0.72 watts, respectively. In each example, 0.4 mole of pyridine and 4.13 moles of carbon tetrachloride were added to the flask and heated to reflux (78° C.) while adding sufficient chlorine to obtain a terminal molar ratio of 2 moles of pyridine to 1 mole of chlorine.

The reaction time, rate of production product, and conversion and yield results are presented below along with the corresponding information for a test in which no artificial light was employed.

| Example | Light Intensity, Watts | Reaction Time, Minutes | Grams, 2-Chloro-Pyridine Per Minute | Percent Pyridine Conversion | Percent Yield 2-Chloropyridine |
|---|---|---|---|---|---|
| 4 | 10.5 | 89 | 0.14 | 48.7 | 55.7 |
| 5 | 5.6 | 65 | 0.15 | 34.5 | 61.9 |
| 6 | 0.72 | 115 | 0.05 | 34.2 | 34.7 |
| No light | 0 | 52 | 0 | 13.2 | 0.0 |

These examples demonstrate that a relatively small light intensity (0.72 watt) markedly increases the percent conversion and yield of 2-chloropyridine when compared to the results obtained with no artificial light.

Examples 7–8

To illustrate the effect of various solvents and diluents on the novel reaction of this invention, the following tests were carried out. In Example 7, the solvent consisted of a mixture of water and pyridine. To the apparatus described above, employing Light A, 24.7 moles of pyridine and 1.1 moles of water were added to the reactor and heated to a temperature ranging between 98.5 and 102° C. for a period of 25 minutes while passing 7.0 grams through the solution. The terminal ratio at the end of this period was 24.3 moles of pyridine per mole of chlorine. No solids formed and analysis of the liquid residue showed 16.3 percent pyridine conversion and a yield of 12.8 percent 2-chloropyridine.

In Example 8, the procedure of Example 7 was repeated with the exception that 10.0 moles of pyridine was added to the reactor and 18.0 grams of chlorine was introduced above the surface of the pyridine over a period of 61 minutes while maintaining the temperature of the liquid between 116 and 119° C. The residue contained 35.5 grams of solids and analysis of the filtrate showed a 19.0 percent pyridine conversion and a 28.5 percent yield of 2-chloropyridine.

Example 9

The procedure of Example 2 (Light source B) was repeated with the exception that the molar ratio of carbon tetrachloride to pyridine was reduced from 10.3:1 to 0.5:1. During this reaction the temperature varied within the range between 91 and 124° C. Twelve grams of chlorine were passed through the liquid for 47 minutes. Analysis of the filtrate showed a 58.9 percent pyridine conversion, a 60.7 percent yield of 2-chloropyridine containing 1.8 percent 3,5-dichloropyridine and 0.3 percent 2,6-dichloropyridine.

Example 10

The preparation of 2-chloropyridine was effected by reacting chlorine and pyridine in the vapor phase in an apparatus comprised of a one-liter, three-necked flask. One neck of the flask was provided with a water condenser. Another leg of the flask was provided with a U-shaped tube having an outlet at the bottom of the U communicating with the flask. There was an inlet at the top of one leg of the U for introducing chlorine and another at the top of the other leg of the U for introducing a heated mixture of pyridine and carbon tetrachloride. Light B was placed between the legs of the U and the U tube was wrapped with heating tape. The flask was placed in an ice bath positioned on top of a magnetic stirrer, a magnetic element being positioned in the flask to permit stirring of the carbon tetrahcloride solution.

A solution of 1 mole of pyridine and 0.88 mole of carbon tetrachloride was heated in an inert atmosphere and added dropwise to one inlet of the U-tube. Chlorine gas (0.53 mole) was added at the rate of about 0.4 gram per minute to the other leg of the U-tube. The temperature in the vapor phase was between about 110 and 125° C. On the basis of the flow rate and volume of the reactor it was calculated that the residence time of the reactor was about 47 seconds. The terminal molar ratio was 1.9 moles of pyridine to 1 mole of chlorine. After separating solids from the residue, analysis of the filtrate indicated a 49 percent conversion of pyridine and a 42.5 percent yield of 2-chloropyridine. Analysis also showed that the filtrate contained about 3 percent 3,5-dichloropyridine and 8.5 percent 2,5-dichloropyridine.

Various modifications of the invention may be employed without departing from the spirit and scope of the invention. Therefore we do not wish to be limited except by the appended claims.

We claim:

1. The process for preparing 2-chloropyridine by reacting pyridine with chlorine, the improvement which comprises carrying out the reaction in the presence of photolytic light.

2. The process of claim 1 wherein the molar ratio of chlorine to pyridine is in the range between about 0.5:1 and about 10:1.

3. The process of claim 1 wherein chlorine and pyridine are reacted in a vapor phase.

4. The process of claim 1 wherein chlorine and pyridine are reacted in a liquid phase.

5. The process of claim 4 wherein said liquid phase contains carbon tetrachloride.

6. The process of claim 5 wherein the molar ratio of carbon tetrachloride to pyridine in said liquid phase is in the range between 0.5:1 and about 11:1.

7. The process of claim 6 wherein the molar ratio of pyridine to chlorine is in the range between about 1:1 and about 10:1.

8. The process of claim 3 wherein said vapor phase contains carbon tetrachloride, the molar ratio of pyridine to chlorine being in the range between about 0.5:1 and about 10:1 and the molar ratio of carbon tetrachloride to pyridine being in the range between about 0.5:1 and about 11:1.

References Cited by the Examiner

UNITED STATES PATENTS

| | | | |
|---|---|---|---|
| 2,773,758 | 12/1956 | Schlesinger | 204—158 |
| 3,186,994 | 6/1965 | Johnson et al. | 260—290 |

FOREIGN PATENTS 805,915  12/1958  Great Britain.

JOHN H. MACK, *Primary Examiner.*

HOWARD S. WILLIAMS, *Examiner.*